United States Patent
Bramley et al.

(10) Patent No.: US 7,853,826 B2
(45) Date of Patent: Dec. 14, 2010

(54) OPERATING SYSTEM TRANSFER AND LAUNCH WITHOUT PERFORMING POST

(75) Inventors: Richard Bramley, Mansfield, MA (US); Paul Chicoine, North Attleboro, MA (US); Aamir Rashid, Norwood, MA (US)

(73) Assignee: Phoenix Technologies, Ltd., Milpitas, CA (US)

( * ) Notice: Subject to any disclaimer, the term of this patent is extended or adjusted under 35 U.S.C. 154(b) by 759 days.

(21) Appl. No.: 10/950,199

(22) Filed: Sep. 24, 2004

(65) Prior Publication Data

US 2006/0070032 A1    Mar. 30, 2006

(51) Int. Cl.
*G06F 11/00* (2006.01)

(52) U.S. Cl. ..................................................... 714/13

(58) Field of Classification Search ............... 714/13, 714/15, 23, 36
See application file for complete search history.

(56) References Cited

U.S. PATENT DOCUMENTS

| | | | |
|---|---|---|---|
| 5,029,077 A | 7/1991 | Fatahalian et al. | 364/200 |
| 5,136,711 A | 8/1992 | Hugard et al. | 395/700 |
| 5,928,348 A * | 7/1999 | Mukai et al. | 710/263 |
| 6,263,396 B1 * | 7/2001 | Cottle et al. | 710/263 |
| 6,356,284 B1 | 3/2002 | Manduley et al. | 345/779 |
| 6,362,836 B1 | 3/2002 | Shaw et al. | 345/744 |
| 6,367,074 B1 | 4/2002 | Bates et al. | 717/11 |
| 6,373,498 B1 | 4/2002 | Abgrall | 345/619 |
| 6,393,560 B1 * | 5/2002 | Merrill et al. | 713/2 |
| 6,405,309 B1 | 6/2002 | Cheng et al. | 713/1 |
| 6,438,750 B1 | 8/2002 | Anderson | 717/178 |
| 6,449,682 B1 | 9/2002 | Toorians | 711/100 |
| 6,496,847 B1 | 12/2002 | Bugnion et al. | 709/1 |
| 6,496,893 B1 | 12/2002 | Arai | 710/302 |
| 6,519,659 B1 | 2/2003 | Stevens | 710/15 |
| 6,560,702 B1 | 5/2003 | Gharda et al. | |
| 6,564,318 B1 | 5/2003 | Gharda et al. | |

(Continued)

FOREIGN PATENT DOCUMENTS

EP    0 197 552    10/1986

OTHER PUBLICATIONS

Negus, Christopher, "*Linux® Toys II, 9 Cool New Projects for Home, Office and Entertainment*," Wiley Publ'g, Inc., excerpts from Chapter 5.

(Continued)

*Primary Examiner*—Christopher S McCarthy
(74) *Attorney, Agent, or Firm*—K&L Gates LLP

(57) ABSTRACT

A device operating method includes saving initial state information of an electronic device. Next, transferring control of the electronic device to a principal operating system. After transferring control and upon receiving an operating system shut down indication signal, transferring control of the electronic device to an alternate operating system without performing a power on self test. An electronic device includes a processor and at least one memory. The memory maintains instructions, in the form of program code, that when executed by the processor causes the processor to save the initial state information of the electronic device. Next, control of the electronic device is transferred to a principal operating system. After the principal operating system has been launched and upon receiving an operating system shut down indication signal, transfer control of the electronic device to an alternate operating system without performing a power on self test.

20 Claims, 3 Drawing Sheets

U.S. PATENT DOCUMENTS

| | | | |
|---|---|---|---|
| 6,578,142 B1 | 6/2003 | Anderson et al. | 713/2 |
| 6,622,169 B2 | 9/2003 | Kikinis | 709/220 |
| 6,633,976 B1 | 10/2003 | Stevens | 713/2 |
| 6,687,819 B1 | 2/2004 | Aguilar et al. | 713/2 |
| 6,715,043 B1 | 3/2004 | Stevens | 711/154 |
| 6,748,511 B2 | 6/2004 | Nichols | 711/173 |
| 6,763,458 B1 | 7/2004 | Watanabe et al. | 713/100 |
| 6,765,788 B2 | 7/2004 | Wu | 361/680 |
| 6,772,313 B2 | 8/2004 | Oh | 711/173 |
| 6,779,109 B2 | 8/2004 | Stevens | 713/1 |
| 6,854,009 B1 | 2/2005 | Hughes | 709/220 |
| 6,889,640 B2 | 5/2005 | Bramley, Jr. | 714/6 |
| 6,948,058 B2 | 9/2005 | Tung | 713/2 |
| 7,010,627 B2 | 3/2006 | Lin | 710/67 |
| 7,072,950 B2 | 7/2006 | Toft | 709/219 |
| 7,076,644 B2 | 7/2006 | Hsu | 713/1 |
| 7,076,646 B2 | 7/2006 | Chang | 713/1 |
| 7,082,526 B2 | 7/2006 | Chang | 713/2 |
| 7,089,410 B2 | 8/2006 | Sato et al. | 713/1 |
| 7,185,189 B2 | 2/2007 | Stevens | 713/2 |
| 7,207,039 B2 | 4/2007 | Komarla et al. | 717/178 |
| 7,689,820 B2 * | 3/2010 | Pierce et al. | 713/2 |
| 7,694,123 B2 * | 4/2010 | Prasse et al. | 713/2 |
| 2002/0133702 A1 | 9/2002 | Stevens | 713/163 |
| 2002/0157001 A1 * | 10/2002 | Huang et al. | 713/2 |
| 2002/0162052 A1 | 10/2002 | Lewis | 714/36 |
| 2003/0018892 A1 | 1/2003 | Tello | 713/164 |
| 2003/0097553 A1 | 5/2003 | Frye, Jr. | 713/2 |
| 2004/0225876 A1 | 11/2004 | Lam | 713/2 |
| 2005/0005197 A1 | 1/2005 | Chong et al. | 714/36 |
| 2005/0108585 A1 | 5/2005 | Yang | 713/310 |
| 2008/0229159 A1 * | 9/2008 | Viljoen | 714/57 |
| 2010/0083043 A1 * | 4/2010 | Niioka | 714/23 |
| 2010/0174895 A1 * | 7/2010 | Pierce et al. | 713/2 |

OTHER PUBLICATIONS

"Red Hat Linux, The Official Red Hat Linux Users Guide," Red Hat Software, Inc. (Rev. 4, Aug. 1996) excerpts from Chapters 1, 2.

"Preboot Execution Environment (PXE) Specification," Intel Corp., Version 2.1, Sep. 20, 1999.

Jun. 6, 2002 screenshots from www.elegent.com, available at www.archive.org.

Singer, Michael, "Lindows Launches its 'Media Computer,'" Jan. 28, 2003, available at www.internetnews.com/bus-news/print.php/1575991.

"Desktop Linux Leaders To Hold Summit," Oct. 24, 2002, available at www.desktoplinux.com/news/NS7709909925.

"Elegent to Power Lindows Media Computer, etDVD and Lindows.com Technology Combine to Create Low-Cost Media Computer," Jan. 30, 2003, PRNewswire-FirstCall.

Press Release, "Compact, low-cost DVD, high fidelity music player and personal computer," Jan. 28, 2003, available at http://web.archive.org/web/20030207211013/www.lindows.com/lindows_news_pressreleases_archives.php?id+37.

1999-2000 screenshots from www.blueskyinnovations.com available at www.archive.org.

PCT International Preliminary Report on Patentability for International Patent Application No. PCT/US2005/029682.

PCT International Search Report, for International Patent Application No. PCT/US2005/029682, mailed Feb. 6, 2006.

PCT Written Opinion of the International Searching Authority for International Patent Application No. PCT/US2005/029682, mailed Feb. 6, 2006.

* cited by examiner

US 7,853,826 B2

OPERATING SYSTEM TRANSFER AND LAUNCH WITHOUT PERFORMING POST

FIELD OF THE INVENTION

The present invention generally relates to electronic devices and, more particularly, to transferring control of an electronic device between two or more resident operating systems and launching the same without having to perform power on self test.

BACKGROUND OF THE INVENTION

Electronic devices, for example, personal computers, personal digital assistants (PDAs), laptop computers, tablet computers, palm top computers, wireless communication devices and other suitable devices and combinations thereof typically include an operating system (OS) in a corresponding memory of the device. The operating system is used, for example, to control the operation of the corresponding electronic device and direct the processing of programs (e.g. application programs), for example, by assigning storage space in memory and controlling input and output functions among several functions.

Typically, an electronic device will have a single OS stored in memory. However, in some devices, multiple (e.g. two or more) operating systems may be resident in a single memory component or multiple memory components of the device. In those devices or systems where the memory is distributed across a network, the multiple operating systems may be resident on one or more distributed memory locations. One purpose for including two or more OS in a single device is to provide for continuity of operation in case of a catastrophic event (e.g. shut down) to the operating system that is active (e.g. controlling the electronic device). Another purpose is to provide support for applications or other programs that may not have been written to run under a particular OS.

Currently, when it is necessary or otherwise desirable to switch device control from the active OS to the second or otherwise non-active OS, or from a first OS to a second OS and back to the first OS, the device must be restarted and the basic input/output system (BIOS) Power On Self Test (POST) code must be re-executed before the subsequent OS is started. Executing POST is required to ensure that the electronic device is in a known (e.g. PC compatible) state before the alternate or next OS starts to load.

A drawback associated with conventional device operation is that switching from one OS to another OS incurs the overhead time of executing POST each time an OS is started. Thus, the user may have to wait a lengthy period of time before the corresponding device can be used. Currently, attempting to switch between operating systems without executing POST may result in unpredictable device behavior, including crashing.

SUMMARY OF THE INVENTION

A device operating method includes saving critical initial state information, for example, the interrupt vector table, basic input output system (BIOS) data area, interrupt enable mask data and keyboard controller command byte data of the electronic device. Next, transfer control of the electronic device to a principal operating system, for example, by handing off device execution to the principal operation system boot loader and launching the principal operating system. After the principal operating system has been launched and upon receiving an operating system shut down indication signal, for example, a user request to transfer to another operating system or device shut down signal, transferring control of the electronic device to an alternate operating system without performing a power on self Lest.

Alternatively, instead of transferring control to an alternate operating system, the method of the present invention can be used to restart or otherwise re-launch the previously executing operating system. This may occur, for example, when a device failure occurs or the user requests that the operating system be restarted.

An electronic device includes a processor and at least one memory. The memory maintains instructions, in the form of program code, that when executed by the processor causes the processor to save the initial state information of the electronic device for example, the interrupt vector table, basic input output system (BIOS) data area, interrupt enable mask data and keyboard controller command byte data of the electronic device. Next, control of the electronic device is transferred to a principal operating system, for example, by handing off device execution to the principal operation system boot loader and launching the principal operating system. After the principal operating system has been launched and upon receiving an operating system shut down indication signal, for example, a user request to transfer to another operating system or device shut down signal, transfer control of the electronic device to an alternate operating system without performing a power on self test.

Alternatively, the program code may cause the processor to restart or otherwise re-launch the previously executing operating system. This may occur, for example, when a device failure occurs or the user requests that the operating system be restarted.

An advantage provided by the present invention is that it provides for the fast transfer of execution between operating systems.

Another advantage provided by the present invention is that it allows for the transfer of control between operating systems without having to perform a power on self test.

BRIEF DESECRIPTION OF THE DRAWINGS

The present invention and the related advantages and features provided thereby will be best appreciated and understood upon review of the following detailed description of the invention, taken in conjunction with the following drawings, where like numerals represent like elements, in which.

DETAILED DESCRIPTION OF THE INVENTION

An exemplary embodiment of the present invention will now be described with reference to FIGS. 1-3. The description of well known components is not included in this description so as not to obscure the disclosure or take away or otherwise reduce the novelty of the present invention and the main benefits provided thereby.

Figure 1:
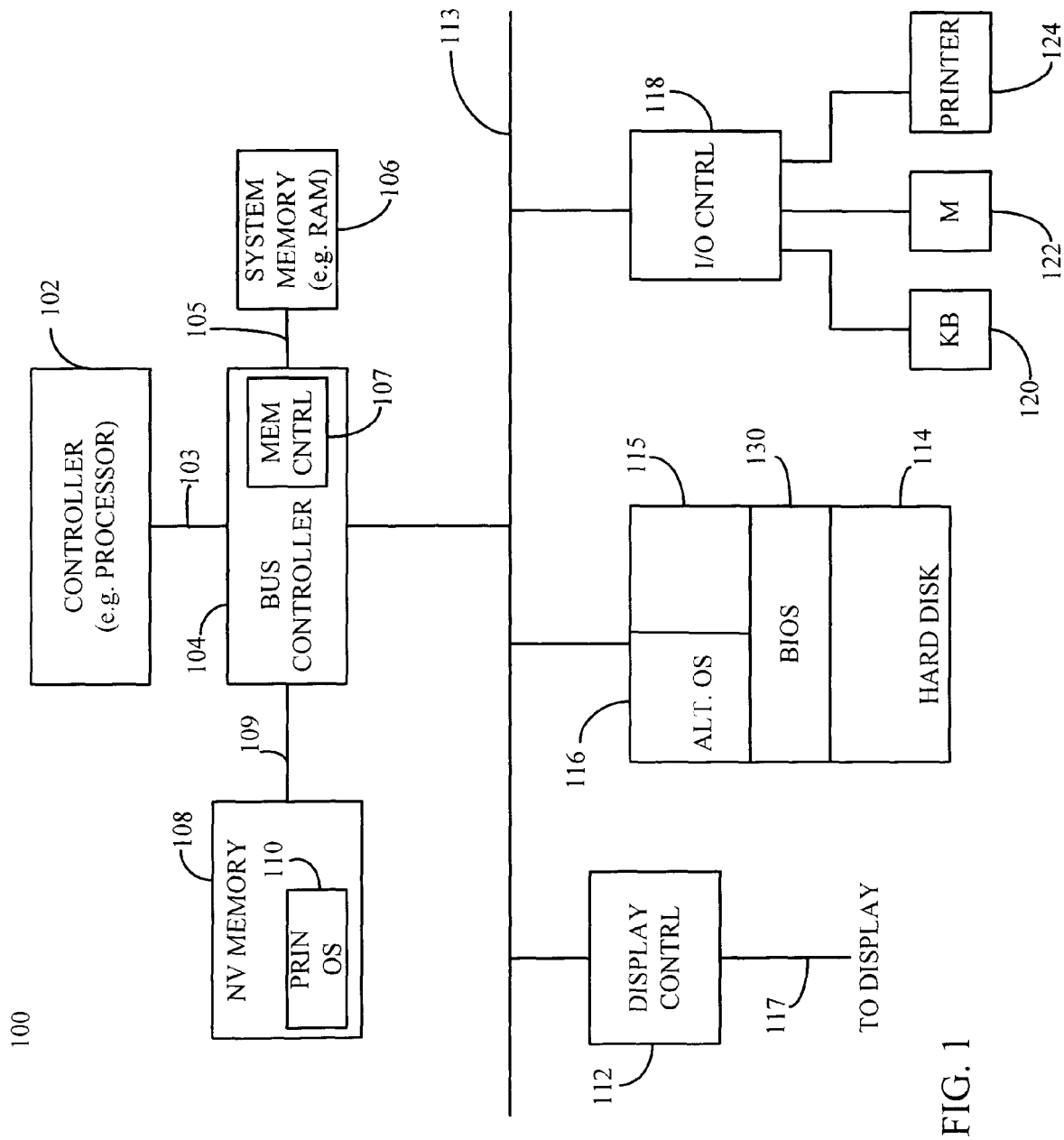
FIG. 1 is a schematic block diagram of an electronic device implementing the operating system transfer and launch functionality according to the present invention.

FIG. 1 is a schematic block diagram of an electronic device implementing the operating system transfer and launch functionality according to the present invention. In an exemplary embodiment, the electronic device 100 is implemented as a personal computer, for example, a desktop computer, a laptop computer, a tablet PC or other suitable computing device. However, it will be appreciated by those of ordinary skill in the art, that the electronic device 100 may be implemented as a PDA, wireless communication device, for example, a cellular telephone, embedded controllers or devices, for example, routers and set top boxes, printing devices or other suitable devices or combination thereof. The personal computer 100 includes at least one controller or processor 102, configured to control the overall operation of the device 10.

The processor 102 may include an arithmetic logic unit (ALU) for performing computations, one or more registers for temporary storage of data and instructions, and a controller for controlling the operations of the personal computer 100. In one embodiment, the processor 102 includes any one of the x86, Pentium™, and PentiumPro™ microprocessors manufactured by Intel Corporation, or the K-6 microprocessor marketed by Advanced Micro Devices. Further examples include the 6×86MX microprocessor as marketed by Cyrix Corp., the 680×0 processor marketed by Motorola; or the Power PC™ processor marketed by International Business Machines. In addition, any of a variety of other processors, including those from Sun Microsystems, MIPS, NEC, Cyrix and others may be used for implementing the processor 102. The processor 102 is not limited to microprocessors, but may take on other forms such as microcontrollers, digital signal processors, dedicated hardware (e.g. ASIC), state machines or software executing on one or more processors distributed across a network.

The processor 102 is coupled to a bus controller 104 by way of a CPU bus 103. The bus controller 104 includes a memory controller 107 integrated therein. In an alternate embodiment, the memory controller 107 may be separate form the bus controller 104. The memory controller 107 provides an interface for access by the processor 102 or other devices to system memory 106, for example, synchronous dynamic random access memory. The bus controller 104 is also coupled to non-volatile memory 108, for example, a flash memory or read only memory of the electronic device 100. Resident in the non-volatile memory 108 is a first or principal OS 110, for example, the Linux operating system. This OS 110 may be used to control the operation of the personal computer 100, after execution of POST.

The bus controller 104 is coupled to a system bus 1113, for example a peripheral component interconnect (PCI) bus, industry standard architecture (ISA) bus, a wireless connection or other suitable communication medium. Coupled to the system bus 113 is a display controller 112, operative to transfer data 117 for display on a corresponding display device (not shown), a hard disk 114, and an input/output (I/O) controller 118.

The hard disk 114 may be any suitable nonvolatile memory, for example, flash memory. The hard disk 114 maintains the BIOS 130 of the personal computer 10. The BIOS 130 is responsible for initializing and configuring the various hardware subsystems, for example, display controller 112, Input/Output (I/O) controller 118 or other suitable device or series of devices present within or controlled by the personal computer 100, and initiates the operating system (OS) boot process. In application, the BIOS 130 is a series of code segments that when executed by the processor 102, cause the processor 102 to perform specified tasks, for example, the initialization and booting tasks. These initialization and booting tasks are typically referred to as the Power on Self Test (POST). The hard disk 114 may also include a host protected area (HPA) 115, which is a secure, dedicated area of the hard disk 114 inaccessible by the OS or other subsystems of the personal computer 100 that may maintain a second or alternate OS 16, for example, the Windows™ operating system. Although illustrated as being maintained in separate memories, in alternate embodiments the principal OS 110 and second OS 116 may be maintained in the same memory component. For example, the principal OS 110 may be stored in the non-volatile memory 108, the hard disk 114, or other suitable memory component.

In addition, the BIOS 130 may be stored in a processor readable medium or transmitted by a computer data signal embodied in a carrier wave over a transmission medium or other suitable communication link. The processor readable medium may include any medium that can store or transfer information, for example, an electronic circuit, a semiconductor memory device, a ROM, a flash memory, an erasable programmable ROM (EPROM), a floppy diskette, a CD-ROM, an optical disk, a fiber optic medium, a radio frequency (RF) link or other suitable medium. The computer data signal may include any signal that can propagate over a transmission medium, for example, electronic network channels, optical fibers, air electromagnetic, RF links, or other suitable transmission medium. The code segments may be downloaded via computer networks, for example, the Internet, an intranet, LAN, WAN or other suitable network or combinations thereof.

The I/O controller 118 is configured to control the transfer of information between a plurality of input devices, for example, a keyboard 120, mouse, joystick or other peripheral input device 122 and a plurality of output devices, for example, printer 124.

In application, when the personal computer 100 is turned on or otherwise started, the BIOS 130 performs the POST operations before handing over device control to the operating system, for example, the principal OS 110. Transferring control is performed, for example, by the processor 102 transferring the principal OS 110 from either the non-volatile memory 108 or the hard disk 114 (where is may alternatively be stored) to the system memory 106 where it is executed. From the system memory 106, the principal OS 110 may start initializing and execution application programs, for example, Word processing programs, MP3 players, and other suitable applications resident in the system memory 106.

Figure 2:
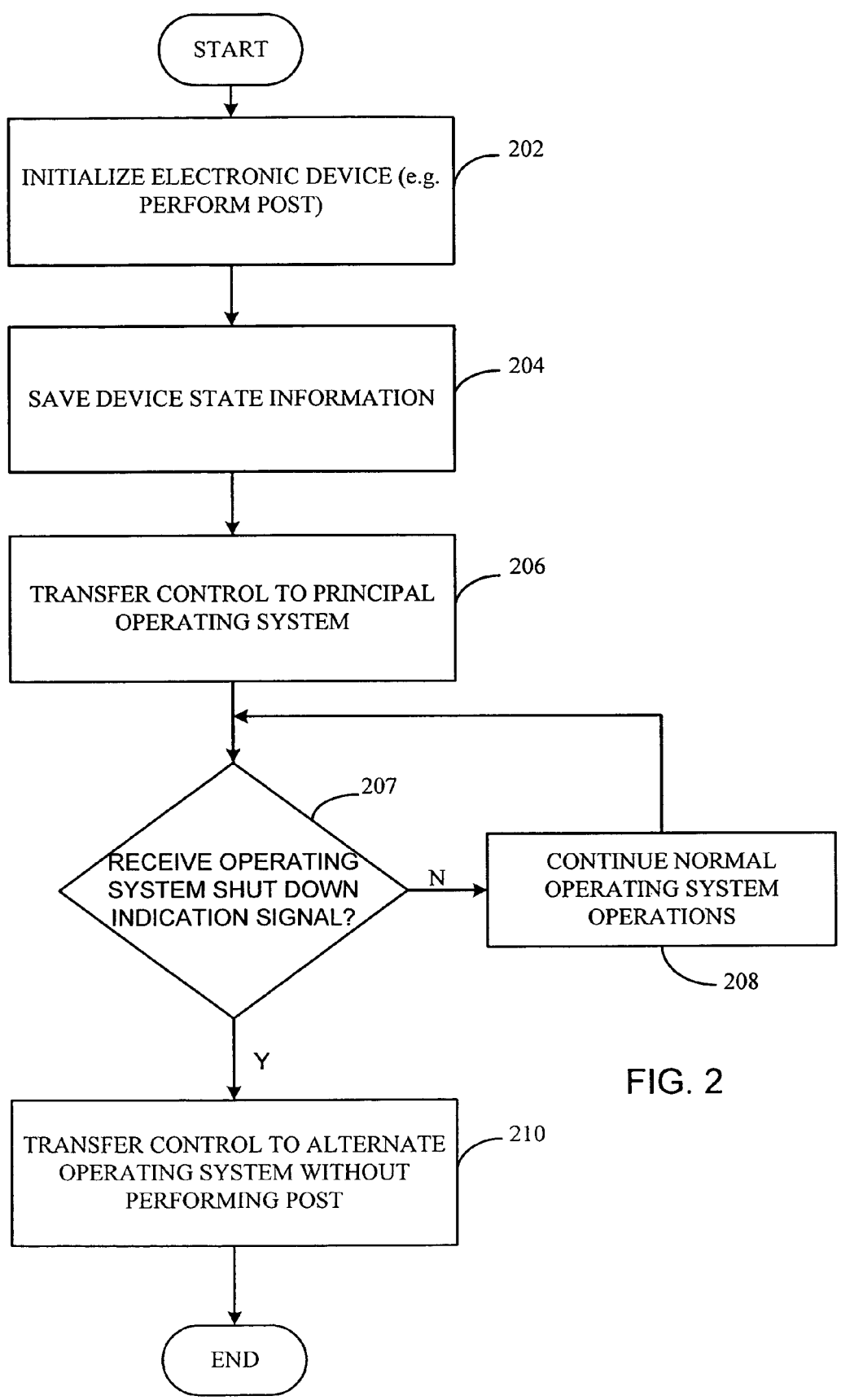
FIGS. 2 and 3 are flow charts illustrating the operations performed by the electronic device when switching between operating systems and launching the switched operating system according to the present invention.

FIG. 2 is a flow chart illustrating the operations performed by the personal computer 100 when switching between operating systems and launching the switched operating system according to an exemplary method 200 of the present invention. The following steps are performed by and/or in conjunction with the BIOS of the personal computer. Thus, the steps are performed independent of, and do not rely on, the particular operating system that is currently running on the personal computer.

In step 202, the personal computer is initialized or otherwise powered up. This may be accomplished, for example, by the user depressing or otherwise activating the start or applicable power on button, or the device being remotely or automatically powered on, for example, under software control. Upon power up, the personal computer performs its power on self test (POST) routine, where the several hardware subsystems that are part of, or are otherwise controlled by, the personal computer are initialized.

In step 204, the critical device state information of the personal computer is saved, for example, in the portion of the BIOS that loads the boot loader or the boot loader itself. During this step, the interrupt vector table, BIOS data area, interrupt enable mask from the interrupt controller or device specific controller, for example, keyboard controller and keyboard controller command byte are stored. This represents the minimum amount of information required to return the personal computer its original (e.g. pre-started) or known state.

In step 206, control of the personal computer is transferred to the principal operating system, for example, Linux by the BIOS handing off execution control of the personal computer to the principal OS boot loader. The boot loader, in turn, points to a specified memory location, for example, in the non-volatile memory where the principal operating system is located and causes the processor to begin executing the OS code from that location. Alternatively, the operating system can be transferred from the non-volatile memory to the system memory, from where it is executed by The processor. From here, the OS may execute a variety of application programs, for example, word processing programs, MP3 players or any suitable application that are maintained in the system memory. Moreover, if the personal computer is connected to a distributed network, the OS and any application program called and executed thereby may be obtained from any location within the distributed network.

In step 207, a determination is made as to whether an OS shutdown indication signal is received. This is accomplished, for example, by the user requesting an operating system change, the receipt of hardware or software interrupts, or the occurrence of a catastrophic event or device shut down event or checking the value in a particular register or series of registers. If no OS shutdown indication signal is received, the process proceeds to step 208 where normal OS operation continues until an OS shutdown indication signal is received or detected. If, on the other hand, an OS shutdown signal is received, the process proceeds to step 210.

In step 210, control of the personal computer is transferred to an alternate operating system, for example Windows™, without performing POST. Alternatively, the currently active OS may be restarted. The operations performed in step 210 are described with reference to FIG. 3. The process then ends.

Figure 3:
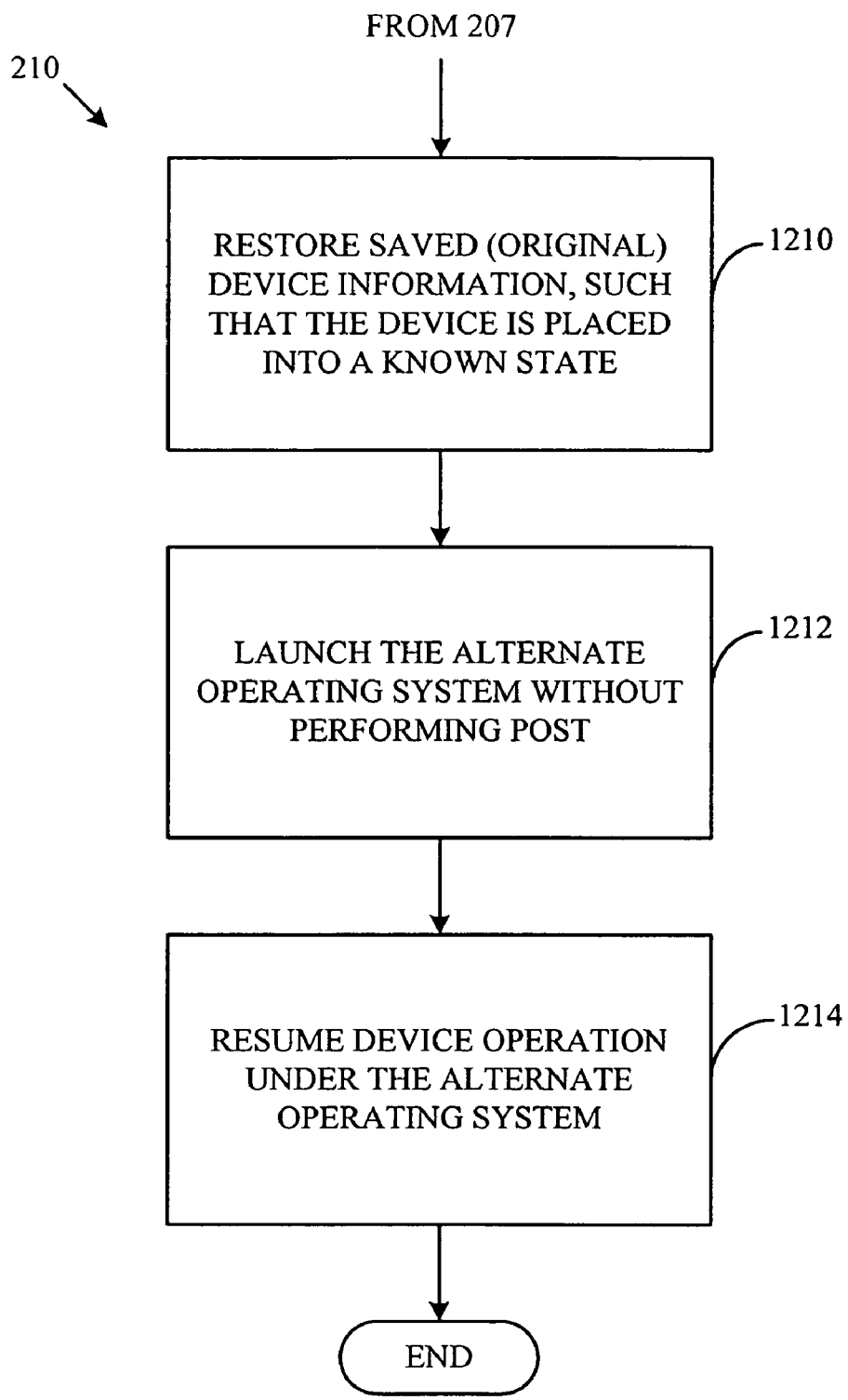

FIG. 3 is a flow chart illustrating the operations performed during the transfer control operation of step 210. The following discussion will assume a transfer of control from the Linux OS to the Windows™ OS. However it will be appreciated by those of ordinary skill in the art that control transfer may be from Windows™ to Linux or from other suitable operating systems. Additionally, in an alternate embodiment, the following operations may be performed when the currently active OS is to be restarted. In step 1210, the personal computer is restored to a known (e.g. PC Compatible) state, for example, the state it was in before the currently executing OS was launched. This is accomplished by restoring the previously saved critical device state information, for example, the original interrupt vector table, BIOS data area, interrupt enable mask and keyboard controller command byte of the personal computer.

In step 1212, the alternate OS is launched without performing POST. This is accomplished, for example, by the principal OS being shut down and the BIOS issuing an INT19 command which loads the OS boot loader of the alternate OS to be activated. The alternate OS boot loader will point to a particular memory location where the personal computer will boot from. In the exemplary embodiment, the alternate OS boot loader will point to the memory location where the Windows™ OS or other suitable operating system is to begin executing. By initiating INT19 after the personal computer state has been returned or otherwise restored to a known (e.g. original) state, the processor acts as if the alternate OS was launched from POST. In this manner, the personal computer does not have re-execute POST; therefore, greatly enhancing the speed and efficiency of transferring between multiple operating systems as compared to conventional techniques as the personal computer does not have to be turned off and restarted. In turn, by not having to restart the personal computer, the delay time in being able to use the computer from restart is significantly reduced.

In step 1214, device operation resumes operation is resumed under the alternate OS. The personal computer will continue to operate under the alternate OS until it is turned off, the user requests an OS change or a shut down condition occurs.

Given the above discussion, it will be appreciated by those of ordinary skill in the art that the present invention can also be used to transfer device control, for example, from Windows™ or other secondary operating system to Linux; or from Linux to a third operating system, for example, MS-DOS. For example, when the personal computer transfers control from Windows™ to another OS, the following shutdown procedure occurs in step 1210, the interrupt vector table is restored; the BIOS data area is restored; interrupt enable mask data is restored; keyboard controller command byte is restored in the keyboard controller; the keyboard flags in the BIOS data area and the internal state of the keyboard controller (e.g. buffer pointers, shift states and other suitable data) are synchronized; INT19.bin or other suitable code is copied into real mode address space to support further restoration; the processor mode is switched from protected mode to real mode; and the copied code is launched into real mode address space to continue restoration.

The real mode code that is executed causes the processor to perform the following operations: restore control port B, which controls parity error and non-maskable interrupt generation; initialize the device program interval timer; initialize the direct memory access (DMA) controllers; initialize the programmable interrupt controllers; clear any pending real-time clock update, periodic or alarm interrupts; initialize memory; set address line 20 to a compatible state; set the limits on the segment registers to compatible values; set a compatible video mode; clear the warm boot flag in the BIOS data area; clear the shutdown byte in memory; set processor control registers to known (e.g. compatible) values; and provide that there is no advanced power management connection.

By implementing the method of the present invention, the electronic device is guaranteed to be returned to a known (e.g. PC Compatible) state before operating system transfer. This results in device hanging, or locking up, being substantially reduced or eliminated because the device is restored to the known state before the alternate OS is launched. Thus, the alternate OS performs as if it was launched normally from POST. Additionally, the present invention will work with any applicable operating system, as the present invention does not require prior knowledge of the operating system before transferring to the operating system.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings. Accordingly, the scope of the present invention is to be defined by the claims appended hereto.

What is claimed is:

1. An operating method comprising:
 saving initial state information of an electronic device prior to launching a principal operating system of the electronic device, said initial state information being independent of any operating system providable by the electronic device;

launching the principal operating system of the electronic device;

transferring control of the electronic device to the principal operating system; and upon receiving an operating system shut down indication signal, transferring control of the electronic device to an alternate operating system without performing a power on self test.

2. The operating method of claim 1, wherein the operating system shut down indication signal is a first operating system shut down indication signal, which further includes, upon receiving a different second operating system shut down indication signal after transferring control of the electronic device to the alternate operating system, transferring control of the electronic device from the alternate operating system to the principal operating system without performing the power on self test.

3. The operating method of claim 2, wherein transferring control of the electronic device from the alternate operating system to the principal operating system includes launching the principal operating system without performing the power on self test.

4. The operating method of claim 1, wherein transferring control of the electronic device to the alternate operating system includes launching the alternate operating system without performing the power on self test.

5. The operating method of claim 1, wherein transferring control of the electronic device to the alternate operating system further comprises:

causing a basic input output system to transfer device execution control of the electronic device to an operating system boot loader; and thereafter launching the alternate operating system.

6. The operating method of claim 1, wherein receiving the operating system shut down signal further comprises receiving a request from a user for a change of operating systems.

7. The operating method of claim 1, wherein receiving the operating system shut down signal further comprises receiving a device shut down signal from a hardware component of the electronic device.

8. The operating method of claim 1, wherein saving the initial state information further comprises storing at least one piece of initial state information selected from the group consisting of:

(a) an interrupt vector table, (b) a basic input output system data area, (c) an interrupt enable mask of at least one programmable interrupt controller, and (d) a keyboard controller command byte, in at least one predetermined memory location, each piece of initial state information being independent of any operating system providable by the electronic device.

9. The operating method of claim 8, wherein the predetermined memory location includes a designated area of a memory device which contains the alternate operating system.

10. A method of transferring device control among a plurality of different operating systems, said method comprising:

receiving an operating system shutdown indication signal while in a first one of the plurality of different operating systems;

in response to receiving the operating system shutdown indication signal, restoring a device configuration to a known state, said known state resulting from a set of initial state information which was saved prior to launching the first one of the plurality of different operating systems, said initial state information being independent of any of the plurality of different operating systems; and after restoring the device configuration to the known state, transferring control to a different second one of the plurality of different operating systems without performing a power on self test.

11. The method of claim 10, wherein transferring control to the different second one of the plurality of different operating systems further includes executing an INT19 command.

12. The method of claim 10, wherein transferring control to the different second one of the plurality of different operating systems further includes restarting a currently executing operating system without performing the power on self test.

13. The method of claim 10, further comprising resuming device operation under control of the different second one of the plurality of different operating systems.

14. The method of claim 10, wherein restoring the device configuration to the known state comprises restoring a previously stored set of critical state information independent of any of the plurality of different operating systems.

15. An electronic device comprising:

a processor; and a memory device which stores a plurality of instructions which, when executed by the processor, cause the processor to:

(a) save a set of initial state information of the electronic device prior to launching a principal operating system, the set of initial state information being independent of the principal operating system and an alternate operating system executable by the processor, (b) transfer control of the electronic device to the principal operating system, and (c) upon receiving an operating system shut down indication signal after transferring control of the electronic device to the principal operating system, transfer control of the electronic device to the alternate operating system without performing a power on self test.

16. The electronic device of claim 15, wherein the operating system shut down indication signal is a first operating system shut down indication signal, and wherein the plurality of instructions cause the processor, upon receiving a different second operating system shut down signal, to transfer control of the electronic device from the alternate operating system to the principal operating system without performing the power on self test.

17. The electronic device of claim 16, wherein the plurality of instructions cause the processor to launch the principal operating system without performing a power on self test.

18. The electronic device of claim 15, wherein the plurality of instructions cause the processor to launch the alternate operating system without performing a power on self test.

19. The electronic device of claim 15, wherein the plurality of instructions cause the processor to issue an INT19 request to transfer device control to the alternate operating system.

20. The electronic device of claim 15, wherein the plurality of instructions cause the processor to restore the device to an original state before transferring control of the electronic device to the alternate operating system.

* * * * *